United States Patent [19]

Doak

[11] Patent Number: 4,469,845
[45] Date of Patent: Sep. 4, 1984

[54] BLENDS OF A RUBBER-MODIFIED POLYVINYL CHLORIDE RESIN AND A POLYMER OF A VINYL AROMATIC MONOMER AND UNSATURATED DICARBOXYLIC ACID ANHYDRIDE MONOMER

[76] Inventor: Kenneth W. Doak, 3469 Burnett Dr., Murrysville, Pa. 15668

[21] Appl. No.: 494,709

[22] Filed: May 16, 1983

[51] Int. Cl.$^3$ .................... C08L 51/04; C08L 53/00
[52] U.S. Cl. ...................... 525/71; 525/74; 525/75; 525/76; 525/78; 525/80; 525/84; 525/85
[58] Field of Search .............. 525/71, 74, 75, 76, 525/80, 84, 85, 78

[56] References Cited

U.S. PATENT DOCUMENTS

| | | | |
|---|---|---|---|
| 3,626,033 | 12/1971 | Keskula | 525/74 |
| 3,642,949 | 2/1972 | Stafford et al. | 525/74 |
| 3,898,301 | 8/1975 | Konishi et al. | 525/74 |
| 4,197,376 | 4/1980 | Lee et al. | 525/74 |
| 4,269,950 | 5/1981 | Abolens et al. | 525/74 |
| 4,305,869 | 12/1981 | Lee et al. | 525/74 |
| 4,311,806 | 1/1982 | Dufour | 525/71 |
| 4,329,272 | 5/1982 | Dufour | 525/74 |
| 4,339,554 | 7/1982 | Doak | 525/63 |

FOREIGN PATENT DOCUMENTS 2015007A 9/1979 United Kingdom .

OTHER PUBLICATIONS

W. J. Hall, R. L. Kruse, R. A. Mendelson, Q. A. Trementozzi, Organic Coatings & Plastics Chemistry Division vol. 47 p. 298; Meeting of the Am. Chem. Soc., Sep. 12-17, 1982.

Primary Examiner—J. Ziegler
Attorney, Agent, or Firm—Parmelee, Miller, Welsh & Kratz

[57] ABSTRACT

A polyblend of (a) 80–20 percent of a rubber-modified vinyl chloride resin, prepared by polymerization of vinyl chloride in the presence of 2 to 20 percent of a rubber, and (b) 20–80 percent of copolymers or terpolymers of a vinyl aromatic monomer, such as styrene, an unsaturated dicarboxylic acid anhydride, such as maleic anhydride, and an optional third monomer such as methyl methacrylate or acrylonitrile, and (c) optionally 0–15 percent of an ungrafted rubber such as a block copolymer of 1,3-butadiene and styrene; and/or 0–35 percent of a graft copolymer of rubber, styrene, and methyl methacrylate or acrylonitrile. The polyblends have high heat distortion temperatures, high impact strength, good processability, and can be made in a substantially transparent form.

21 Claims, No Drawings

BLENDS OF A RUBBER-MODIFIED POLYVINYL CHLORIDE RESIN AND A POLYMER OF A VINYL AROMATIC MONOMER AND UNSATURATED DICARBOXYLIC ACID ANHYDRIDE MONOMER

RELATED INVENTION

Reference is made to the application of Kenneth W. Doak, Ser. No. 494,708 filed on even date herewith, and entitled "Blends of a Rubber-Modified Polyvinyl Chloride Resin and a Rubber-Modified Polymer of a Vinyl Aromatic Monomer and Unsaturated Dicarboxylic Acid Anhydride Monomer".

BACKGROUND OF THE INVENTION

The present invention relates to blends of (a) rubber-modified vinyl chloride resins (PVC), prepared by polymerizing vinyl chloride in the presence of 2 to 20 percent of rubber; (b) copolymers or terpolymers of a vinyl aromatic monomer, such as styrene or p-methylstyrene, an unsaturated dicarboxylic acid anhydride such as maleic anhydride, and an optional third monomer such as methyl methacrylate or acrylonitrile; and (c) optionally 0 to 15 percent of an ungrafted rubber such as a block copolymer of 1,3-butadiene and styrene; and/or 0 to 35 percent of a graft copolymer of rubber, styrene, and methyl methacrylate or acrylonitrile.

Vinyl chloride resins have good molding characteristics, especially when plasticized, and have good physical properties. However, they have a relatively low softening temperature, particularly when they contain a low molecular weight plasticizer, so that they do not have good dimensional stability at temperatures above about 60° C. (or lower) to about 75° C. In the past, various copolymers or terpolymers with higher softening temperatures than a vinyl chloride resin have been blended into the vinyl chloride resin in order to provide good dimensional stability at a higher temperature. The blending of copolymers or terpolymers containing a vinyl aromatic monomer and maleic anhydride, with optionally a third monomer, in order to modify the properties of a vinyl chloride resin or an acrylonitrile, butadiene, styrene polymer has heretofore been described in various patents.

U.S. Pat. No. 3,642,949 describes blends of copolymers of styrene and maleic anhydride (S/MA) with ABS graft copolymer (rubber-modified copolymer of styrene and 5 to 40 percent of acrylonitrile, prepared by polymerizing the monomers in the presence of rubber) in order to increase the softening temperature of the latter. The S/MA copolymers contained 5 to 35 percent of maleic anhydride, preferably 18 to 25 percent, and were not rubber-modified.

U.S. Pat. No. 3,626,033 describes the preparation of blends of a S/MA copolymer, a vinyl chloride resin, and a high-rubber ABS graft copolymer containing at least 50 percent of rubber. The styrene-acrylonitrile (S/AN) copolymer preferably contained 24 to 48 percent of acrylonitrile, while the S/MA copolymer contained 15 to 30 percent, and preferably about 19 percent, of maleic anhydride. This patent also decribes the preparation of blends of vinyl chloride resin, a S/MA copolymer containing 18 percent of maleic anhydride, and a graft copolymer reported to be a copolymer of methyl methacrylate and acrylonitrile. S/MA copolymers were effective in increasing the softening temperature of the blends. For example, a blend of a vinyl chloride resin and an ABS resin in a 75:25 ratio exhibited a heat distortion temperature of 77.5° C., compared with a 71.5° C. vinyl chloride resin alone. A three-component blend containing 20 percent of an unmodified S/MA copolymer (containing 18 percent of maleic anhydride), together with a vinyl chloride resin and an ABS resin in the same ratio as in the two-component blend, exhibited a heat distortion temperature of 91° C. However, notched impact strength was reduced.

U.S. Pat. No. 4,197,376 describes the preparation of blends of ABS graft copolymers with (a) rubber-modified copolymers of 85 to 65 percent of styrene and 15 to 35 percent (preferably 20 to 30 percent) of maleic anhydride and 2 to 30 percent of rubber (based on total weight of the composition), and (b) rubber-modified terpolymers of styrene, maleic anhydride, and up to 30 percent of a copolymerizable monomer such as methyl methacrylate (S/MA/MM) or acrylonitrile (S/MA/AN). The blends contained 5 to 40 percent of rubber (based on the total weight of the composition). Such blends exhibited better impact strength than blends of unmodified S/MA copolymer and ABS, or of rubber-modified S/MA copolymer with unmodified S/AN copolymer, even when the blends were compounded to the same total rubber level.

U.S. Pat. No. 4,311,806 describes the preparation of blends of a vinyl chloride resin with rubber-modified S/MA copolymers in which the relative weight proportions were 50 to 85 percent of a vinyl aromatic monomer, 15 to 30 percent of maleic anhydride, and 0 to 20 percent of a third monomer such a methyl methacrylate or acrylonitrile. The monomers were polymerized in the presence of 5 to 25 percent by weight of rubber (based on total weight). The blends could optionally contain 0 to 40 percent of ABS graft copolymers or MBS graft copolymers (rubber-modified copolymers of styrene and methyl methacrylate). Again, the copolymers containing maleic anhydride were effective in increasing the heat softening temperatures. The addition of the vinyl chloride resin to the rubber-modified terpolymer caused a large reduction in impact strength. The reduction was less when about 20 percent of ABS resin or MBS resin was added to the blend.

U.S. Pat. No. 4,339,554 describes the preparation of blends of a vinyl chloride resin with 20 to 40 percent of S/MA copolymers containing preferably 18 to 25 percent of maleic anhydride. Blends were also described which contained the corresponding rubber-modified copolymers, which had been prepared by polymerizing the monomers in the presence of 5 to 30 percent of one or more rubbers, based on total weight of the rubber-modified copolymer.

Hall, Kruse, Mendelson, and Trementozzi (Preprint for Organic Coatings and Plastics Chemistry Division, Volume 47, page 298; Meeting of Am. Chem. Soc., Sept. 12–17, 1982) described the formation of blends of various random S/MA/X terpolymers (both rubber-modified and unmodified versions) with random styrene-acrylonitrile (S/AN) copolymers or ABS graft copolymers. The termonomers were acrylonitrile, methyl methacrylate, isobutylene, methyl acrylate, and ethyl acrylate. They defined composition ranges for S/AN copolymers, S/MA copolymers or S/MA/X terpolymers within which blends exhibited compatibility. Compatible pairs exhibited softening temperature (glass transition temperatures) intermediate between those of the two components. Data for blends of ABS and S/MA/X terpolymers were summarized from U.S. Pat. Nos. 4,197,376 and 4,305,869.

British Pat. No. 2,015,007, which is incorporated into this disclosure by reference, discloses blends of vinyl chloride resins with block copolymer rubbers of a diene and a vinyl aromatic monomer, together with up to 20 percent of an impact modifier: (a) MBS, a graft copolymer of methyl methacrylate, a butadiene-based rubber, and styrene; or (b) ABS, a graft copolymer of acrylonitrile, a butadiene-based rubber, and styrene. Blends of rubber-modified vinyl chloride resins with block copolymer rubbers were also disclosed. In both types of blends, the block copolymer rubbers increased impact strength, particularly at low temperatures after aging.

SUMMARY OF THE INVENTION

This invention describes the preparation of new polyblends of a rubber-modified vinyl chloride resin having high heat distortion temperatures, high impact strength, and good processability. These comprise:

A. 80-20 percent by weight of a rubber-modified vinyl chloride resin, optionally containing up to 20 percent, based on total monomers, of a copolymerizable, ethylenically unsaturated comonomer, prepared by polymerization of the monomers in the presence of 2-20 percent, based on total weight of the resin, of a rubber to form a graft copolymer dispersed as discrete particles or strands, and B. 20-80 percent by weight of a copolymer of a vinyl aromatic monomer and an unsaturated dicarboxylic acid anhydride in weight ratios of 95:5 to 70:30, optionally containing up to 25 percent of a third monomer, based on total monomers.

To the polyblend there may also be added up to 15 percent by weight, based on the weight of the polyblend, of an ungrafted block copolymer rubber containing 20-50 percent by weight of a vinyl aromatic monomer, preferably styrene or p-methylstyrene, and 80-50 percent 1,3-polybutadiene, and hydrogenated such block copolymer rubber, dispersed as discrete particles.

To the polyblend there may also be added up to 35 percent by weight, based on the weight of the polyblend, of a graft copolymer of 30-80 percent of methyl methacrylate and 70-20 percent of a vinyl aromatic monomer, preferably styrene or p-methylstyrene, said copolymer being grafted onto 10-60 percent, based on weight of the graft copolymer, of a substrate rubber, or a graft copolymer of 20-40 percent of an unsaturated nitrile, such as acrylonitrile or methacrylonitrile and 80-60 percent of a vinyl aromatic monomer, said copolymer being grafted onto 10-60 percent, based on the weight of the graft copolymer, of a substrate rubber.

DESCRIPTION OF THE INVENTION

Heretofore, the preparation of blends of a vinyl chloride resin with styrene-maleic anhydride copolymers or S/MA/X terpolymers (both glassy and rubber-modified) involved the use of a vinyl chloride resin which might contain various additives, including a relatively large amount of low molecular weight plasticizers. However, blends have not been described which contain a rubber-modified vinyl chloride resin prepared by the polymerization of vinyl chloride in the presence of rubber.

The use of a rubber-modified vinyl chloride resin offers advantages over the use of unmodified vinyl chloride resins in blends with unmodified copolymers and terpolymers containing maleic anhydride. A vinyl chloride resin which contains little or no low molecular weight plasticizer is difficult to process, and it is difficult to obtain a uniform mixture with a copolymer or terpolymer containing maleic anhydride. A nonuniform distribution of graft copolymer particles may therefore result, so that impact strength and other properties may be adversely affected. Rubber-modified vinyl chloride resins have a lower melt viscosity, better processability, and much higher impact strength than the corresponding unmodified polymers. Hence, a more uniform dispersion of graft copolymer particles can be obtained in the blend than when using an unmodified vinyl chloride resin.

The use of relatively large amounts (e.g. up to 30 percent) of a low molecular weight plasticizer, such as dioctylphthalate, will also improve the processability of rubber-modified or unmodified vinyl chloride resins and provide easier mixing in blends. However, its use significantly reduces the softening temperature, as well as stiffness and rigidity, and hence, will adversely affect the properties of blends. Therefore, it is preferable to use little (less than 10 percent) or no plasticizer if maximum heat distortion temperatures are to be obtained.

The rubber-modified vinyl chloride resin is prepared by the polymerization of vinyl chloride in the presence of 2 to 20 percent of a rubber selected from the group consisting of E/VA copolymers (ethylene containing up to 50 percent of vinyl acetate); chlorinated polyethylene containing 20 to 40 percent of chlorine; copolymers of ethylene and propylene or a higher alpha-olefin such as butene-1, hexene-1, 4-methyl-1-pentene, octene-1 and the like, optionally containing less than 15 weight percent (preferably less than 6 weight percent) of a diene, preferably unconjugated, such as ethylidene norbornene, 1,4-hexadiene, and the like, as described in U.S. Pat. No. 4,071,582; acrylate rubbers such as polybutyl acrylate; E/EA copolymers (copolymers containing preferably 85-25 percent of ethylene and 15-75 percent of ethyl acrylate) or E/MA copolymers (copolymers of ethylene and methyl acrylate), as described in U.S. Pat. No. 4,012,460; epichlorohydrin rubbers, and block copolymers of 1,3-butadiene or isoprene and 10 to 55 percent of a vinyl aromatic monomer such as styrene, p-methylstyrene, and the like; hydrogenated products of such block copolymers; and copolymers of cyclopentene and a minor amount of ethylene or a higher alpha-olefin.

The compositions of the rubbers are chosen to prevent complete compatibility with the vinyl chloride resin, but to give a good balance between compatibility and incompatibility, so that the rubber (or graft copolymer) is dispersed as a separate phase, usually as small particles wetted by ungrafted vinyl chloride resin, and the product retains most of the properties (e.g. rigidity and softening point) of a rigid vinyl chloride resin but with enhanced impact strength. Products prepared using the above saturated rubbers (or those containing only a very small amount of a diene) are generally suitable for use in outdoor applications. For indoor applications, it is feasible to use unsaturated rubbers such as polybutadiene, block copolymers of butadiene and up to 35 percent of a vinyl aromatic monomer (e.g. styrene), butadiene-acrylonitrile rubber, and the like. Various block copolymers have been described in British Pat. No. 2,015,007.

The preparation of rubber-modified vinyl chloride resins has been described in various patents; some resins are available commercially. The resin may comprise a homopolymer of vinyl chloride, or a copolymer of vinyl chloride and up to about 20 percent by weight of a copolymerizable, ethylenically unsaturated comonomer such as ethylene, propylene or other alpha-olefin with 4–8 carbon atoms, vinyl acetate, vinylidene chloride, alkyl acrylate, acrylic or methacrylic acid, methyl methacrylate, and the like. Preferably, the amount of comonomer will be less than 10 percent because of the adverse effect on heat distortion temperature and rigidity, and most preferably will be vinyl acetate, ethylene, propylene, or alphaolefin containing 4–8 carbon atoms.

The preparation of a rubber-modified vinyl chloride resin by suspension processes has been reviewed by Burgess, *Manufacturing and Processing of PVC*, MacMillan, New York, 1982. Thus, the preparation of graft copolymers containing chlorinated polyethylene has been described in British Pat. No. 1,029,634. British Pat. Nos. 1,021,324 and 1,027,710 describe the suspension polymerization of a solution of vinyl chloride containing 5 to 15 percent of E/VA copolymer. Graft copolymers containing up to 50 percent of E/VA copolymer may be prepared which may be subsequently diluted with additional vinyl chloride resin to produce a composition containing 5 to 10 weight percent of E/VA copolymer. The preparation of graft copolymers of vinyl chloride and polyacrylate rubbers, e.g. polybutyl acrylate, by suspension polymerization was also described by Burgess. U.S. Pat. No. 3,812,204 describes emulsion and suspension processes for polymerizing vinyl chloride in the presence of polyolefin elastomers. Bulk processes may also be used to prepare the rubber-modified vinyl chloride resin. U.S. Pat. No. 4,007,235 describes a process for the polymerization of vinyl chloride in the presence of elastomeric olefin polymers such as an ethylene-propylene copolymer or a terpolymer containing a small amount of a diene such as ethylidene norbornene or 1,4-hexadiene, to obtain rubber-modified copolymers containing about 6 to 8 percent of rubber with some vinyl chloride grafted to it. The products had reduced particle (grain) size, easy processability, and much higher impact strength, compared with an unmodified polymer. U.S. Pat. No. 4,195,137 describes the preparation of rubber modified vinyl chloride resins containing about 3.5 to 5.5 percent of elastomeric olefin polymers. U.S. Pat. No. 4,071,582 describes the polymerization of vinyl chloride in the presence of about 6.0 to 10 percent of olefin copolymer or terpolymer (EPDM) to obtain a product with reduced particle size and melt viscosity, very high impact strength, and easy processability. Some polyvinyl chloride was grafted to more than 50% of the EPDM. The dispersed rubber and graft copolymer phase had a particle size of 0.1 to 0.5 micron in diameter. The glass transition temperature was 72° C. and the heat distortion temperature was 64.8° C., compared with 65° C. for an unmodified polymer. German Off. No. 1,528,779 describes the polymerization of vinyl chloride in the presence of polyepichlorohydrin or copolymers to prepare a graft copolymer. U.S. Pat. No. 4,012,460 describes the two-stage bulk polymerization of vinyl chloride in the presence of a copolymer of ethylene and methyl or ethyl acrylate. The dispersed graft copolymer had a particle size of 0.1–0.5 micron in diameter.

It should be understood that in a rubber-modified vinyl chloride resin, only a small percentage of polyvinyl chloride chains are actually grafted to the rubber chains, as discussed in U.S. Pat. Nos. 3,812,204, 4,071,582, and 4,012,460. There is some ungrafted rubber, usually in the range of 5 to 50 percent of the total rubber present. The amount of polyvinyl chloride grafted to rubber chains may be as great, or somewhat greater, than the amount of rubber present. When olefin rubbers are used, the amount of grafted polyvinyl chloride is greater for a terpolymer containing a diene monomer than for a saturated copolymer. References to grafted polyvinyl chloride obviously refer to such mixtures. Reference to other graft polymers, or rubber-modified polymers, also refer to mixtures of ungrafted copolymer or terpolymer chains, some chains grafted to rubber, and some ungrafted rubber.

The rubber-modified vinyl chloride resin, 20 to 80 weight percent, is intimately mixed with 80 to 20 weight percent of a polymer containing a vinyl aromatic monomer and an unsaturated dicarboxylic acid anhydride, in weight ratios of 95:5 to 70:30, and optionally up to 25 percent (based on total monomers) of a termonomer selected from the group consisting of methyl methacrylate and an unsaturated nitrile such as acrylonitrile or methacrylonitrile. When acrylonitrile is used as termonomer, the maximum amount in the terpolymer generally is not greater than 20 percent.

The vinyl aromatic monomer which forms a part of the polymer is preferably styrene or p-methylstyrene (vinyl tolune containing over 90 percent of p-methylstyrene) but may also include other nuclear methyl substituted styrenes, dimethylstyrenes, monochlorostyrenes (e.g. o- or p-chlorostyrene or mixtures), alpha-methyl-p-methylstyrene, 2-chloro-4-methylstyrene, tert-butylstyrenes, dichlorostyrenes, especially 2,4-dichlorostyrene, and the like. When alphamethylstyrene, tert-butylstyrene, or dichlorostyrene is used, it is preferable to use a mixture with styrene or p-methylstyrene to form a terpolymer of maleic anhydride and two vinyl aromatic monomers. The preferred anhydride is maleic anhydride, although citraconic anhydride and itaconic anhydride or other anhydrides may also be suitable, while the preferred termonomer is methyl methacrylate or acrylonitrile.

It is sometimes advantageous to use a vinyl aromatic monomer such as p-methylstyrene, or a mixture of styrene or p-methylstyrene with tert-butylstyrene, alphamethylstyrene, or 2,4-dichlorostyrene, which are expected to give a slightly higher softening temperature than the corresponding maleic anhydride polymers containing styrene as the only vinyl aromatic monomer.

The maleic anhydride copolymers or terpolymers are known compositions, and are prepared by polymerizing a mixture of maleic anhydride, vinyl aromatic monomer, and optionally methyl methacrylate or an unsaturated nitrile, such as acrylonitrile, at elevated temperatures, usually in the presence of peroxide initiators. The resulting copolymers or terpolymers have a somewhat random distribution of monomer units along the polymer chains. Typically, the Melt Flow (condition L, grams/10 minutes) is between 0.1 and 10, and is somewhat dependent on the polymer composition.

Various techniques have been described for preparing copolymers and terpolymers containing maleic anhydride. U.S. Pat. Nos. 2,767,804, 2,971,939, and 3,336,267 describe the preparation of copolymers of styrene and maleic anhydride. U.S. Pat. No. 3,336,267 also describes the preparation of terpolymers containing up to about 50 percent of methyl methacrylate or up to about 30 percent of acrylonitrile. U.S. Pat. No. 4,305,869 discribes the preparation of terpolymers containing 15–35 percent of maleic anhydride and up to about 20 percent of methyl methacrylate. Several patents describe processes for the preparation of rubber-modified copolymers and terpolymers. Similar processes can be used for the preparation of unmodified copolymers and terpolymers. For example, U.S. Pat. No. 3,919,354 describes the preparation of rubber-modified copolymers of 95 to 65 percent of styrene and 5 to 35 percent of maleic anhydride. U.S. Pat. No. 4,341,695 describes the preparation of rubber-modified terpolymers of 45 to 83 percent of styrene, 15 to 35 percent of maleic anhydride, and 2 to 30 percent of methyl methacrylate. U.S. Pat. No. 4,262,096 describes the preparation of terpolymers of styrene, maleic anhydride, and acrylonitrile. U.S. Pat. No. 4,197,376 also describes the preparation of rubber-modified and unmodified copolymers and terpolymers.

The copolymers used in this invention will typically contain a vinyl aromatic monomer and maleic anhydride in weight ratios of 95:5 to 70:30. When copolymers contain styrene or p-methylstyrene, the preferred ratio is about 85:15 to 75:25. When a terpolymer containing acrylonitrile is used, the ratio may be as high as 90:10. When a monochlorostyrene, or a mixture of styrene or p-methylstyrene with dichlorostyrene and monochlorostyrene is used, slightly less maleic anhydride may be used, e.g. the ratio may be as high as 95:5.

It is possible to mix additional ungrafted rubber, or a graft copolymer, or both together, into the blend in order to enhance impact strength. Any of the rubbers listed above may be used in amounts up to about 15 percent based on the total weight of the blend. The preferred rubbers are the block copolymer rubbers containing 50 to 80 percent of butadiene and 50 to 20 percent of a vinyl aromatic monomer, especially styrene or p-methylstyrene, and hydrogenated such block copolymers, which can be dispersed as very small discrete particles, discrete, with an average between 0.1 (or less) and 1.0 micron, if shear during mixing is properly controlled.

The graft copolymer (impact modifier) may be used in the blend in amounts up to 35 percent. The preferred copolymer (MBS) comprises a mixture of 20 to 70 percent of a vinyl aromatic monomer, preferably styrene or p-methylstyrene, and 80 to 30 percent of methyl methacrylate (based on the weight of the monomers), copolymerized in the presence of a substrate rubber based on a major amount of 1,3-butadiene. However, if the substrate rubber is a block copolymer, it may contain up to about 50 percent of a vinyl aromatic monomer.

It is also possible to use an ABS resin, a graft copolymer of 60–80 percent of a vinyl aromatic monomer and 40–20 percent of an ethylenically unsaturated nitrile, particularly acrylonitrile or methacrylonitrile. When acrylonitrile is used, the preferred amount is about 20–30 percent, based on weight of the monomers. The preferred amount for methacrylonitrile is about 25–40 percent. The preferred aromatic monomers are styrene, p-methylstyrene, and alpha-methylstyrene, or mixtures thereof. Particularly useful compositions contain 10–35 percent, based on total weight of the composition, of the ABS resin together with the rubber-modified vinyl chloride resin and maleic anhydride polymer in weight ratios of about 67:33 to 40:60.

Suitable MBS impact modifiers for use in this invention have been described in British Pat. Nos. 2,015,007, 1,046,646, and U.S. Pat. No. 4,311,806, but are not necessarily limited to these. British Pat. No. 2,015,007 describes MBS polymers which have a refractive index which matches that of vinyl chloride resins, so that blends of the two are translucent or substantially transparent.

Suitable ABS impact modifiers have been described in British Pat. No. 2,015,007 and U.S. Pat. Nos. 4,197,376, 4,305,869, 4,311,806, 3,642,949, and 3,626,033, but are not necessarily limited to these. British Pat. No. 2,015,007 describes ABS polymers which have a refractive index which matches that of vinyl chloride resins, so that blends of the two are translucent or substantially transparent.

Frequently, the rubber-modified vinyl chloride resin used in the blend exhibits relatively poor transparency because the refractive index of the rubber (graft copolymer) particles differs from that of the corresponding matrix in which they are dispersed. Blends with maleic anhydride polymers also usually exhibit relatively poor transparency. However, the rubber-modified vinyl chloride resin will be translucent or substantially transparent if the rubber chosen has a refractive index which matches that of the matrix, or if the rubber particles are too small to diffract light, e.g. below 0.5 micron and preferably below 0.25 micron. A blend with a maleic anhydride polymer will be translucent or transparent if the rubber particles have the same refractive index as the resin matrix obtained by blending. Ideally, the copolymer (or terpolymer) will have the same refractive index as the polyvinyl chloride matrix, which contains a rubber with a matching refractive index.

In one embodiment of this invention, substantially transparent blends are prepared by mixing a substantially transparent rubber-modified vinyl chloride resin with a substantially transparent terpolymer of a vinyl aromatic compound, maleic anhydride, and methyl methacrylate, to form a relatively uniform mixture. It should be understood that the term "substantially transparent" may represent varying degree of clarity, and generally means that a film or sheet permits light to pass, and that the form of objects can be distinguished when observed through film or sheet, particularly at close distances. Sometimes transparency may be accompanied by varying degrees of haze, as discussed in British Pat. No. 2,015,007. In some instances, clarity may be sufficiently high to permit typed letters to be read, as discussed in British Pat. No. 1,046,646.

The vinyl chloride resin used may contain any rubber (within the scope of the invention) which has an essentially matching refractive index, or which has all of the rubber (graft copolymer particles) dispersed as very small particles. For example, U.S. Pat. No. 4,012,460 describes the preparation of a clear rubber-modified vinyl chloride resin by polymerizing vinyl chloride in the presence of a copolymer of about 82 percent of ethylene and about 18 percent of ethyl acrylate. It was believed that the refractive index of the copolymer matched closely that of polyvinyl chloride. U.S. Pat. No. 3,812,204 describes the preparation of translucent copolymers containing an olefin rubber.

The composition of the terpolymer will be such that its refractive index closely matches that of the vinyl chloride resins. According to British Pat. No. 2,015,007, butadienestyrene block copolymers containing about 25–40 percent of styrene have refractive indices which match those of vinyl chloride resins. According to British Pat. No. 1,046,646, copolymers of 30–65 percent of styrene and 70–35 percent of methyl methacrylate, prepared in the presence of block copolymers of 80–50 percent of butadiene and 20–50 percent of styrene, are substantially transparent, suggesting that they have matching refractive indices. A terpolymer (unmodified) matrix containing maleic anhydride, which also has a matching refractive index, may be prepared by adjusting the amount of methyl methacrylate between about 5 and 25 percent, while maintaining the maleic anhydride content within the range defined by the invention. The polymerization methods described in U.S. Pat. Nos. 4,197,376, 4,305,869, and 3,336,267 may be used. Suitable terpolymers containing acrylonitrile or methacrylonitrile in place of methyl methacrylate may also be prepared.

Optionally, up to 15 percent of an additional ungrafted block copolymer rubber with matching refractive index, as described above, may be added to the blend. Such rubber should be dispersed as very small discrete particles.

Optionally, up to 35 percent of a substantially transparent impact modifier (MBS or ABS) with matching refractive index may be added to the blend to improve impact strength while maintaining translucency or transparency. British Pat. No. 2,015,007 describes commercially available MBS and ABS modifiers which have matching refractive indices and give translucent or transparent blends with vinyl chloride resins. Certain transparent, rubber-modified copolymers of styrene and methyl methacrylate, described in British Pat. No. 1,046,646, may also be suitable, particularly those which contain 30–40 percent of a block copolymer rubber.

The rubber-modified vinyl chloride resin and copolymer or terpolymer may be blended, in the prescribed amounts, by mechanically working the components at a temperature high enough such that the mass is plasticized, e.g. by mixing on a two-roll mill, an internal mixer such as a Brabender or Banbury mixer, a twin-screw extruder, or a Farrell mixer. In order to provide a homogenous blend, the mixing equipment must provide a high shear. Some extruders, especially single screw extruders, may not provide sufficient shear for some blends. In some cases, it may be necessary to plasticize first the component which has the highest melt viscosity, and then add the other components in one or more increments. A batch mixer, or a high shear continuous mixer with one or more side feed ports, might be used. When more than two components are blended, it may sometimes be desirable to prepare first a blend of two components.

The various rubber-modified vinyl chloride resins will exhibit different heat distortion temperatures, depending on the amount of comonomer, rubber, plasticizer, stabilizers and other additives used. Therefore, the heat distortion temperature of a blend will be dependent on the heat distortion of both the rubber-modified vinyl chloride resin, as well as that of the copolymer or terpolymer containing maleic anhydride, and will be intermediate between those of the two components of the blend.

The following illustrates the types and amounts of the components used in the blended compositions of the present invention which will exhibit heat distortion temperatures significantly higher than those of the vinyl chloride resin used in the blends.

In one example, a rubber-modified vinyl chloride resin which contains about 6 percent of rubber and less than about 5 percent of plasticizer, and which exhibits a heat distortion temperature of about 66° C. is mixed in amounts of 65 to 50 percent by weight with 35 to 50 percent of a terpolymer of styrene, maleic anhydride, and methyl methacrylate, in which the monomers have a weight ratio of about 72:18:10. The heat distortion temperatures of the blends will vary between about 72° C. and about 80° C. or higher, and impact strengths will be superior to those for comparable blends in which an unmodified vinyl chloride resin is used.

In one variation, a similar result will be obtained if a part or all of the styrene in the terpolymer used in the blends is replaced by p-methylstyrene. In another variation, about 20 percent (based on total weight of the blend) of an impact modifier (a copolymer of styrene and methyl methacrylate grafted onto a butadiene-based rubber) is added to the blends to improve impact strength with no significant effect on heat distortion temperatures.

In another example, the rubber-modified vinyl chloride resin is mixed in amounts of 30–50 percent with 50 to 70 percent of a copolymer of styrene and maleic anhydride, in which the monomers have a weight ratio of about 80:20. The heat distortion temperatures of the blends will vary between about 75° C. and about 90° C. or higher.

In one variation, a similar result will be obtained if a part or all of the styrene in the copolymer is replaced by p-methylstyrene. In another variation, about 6 percent (based on total weight of the blend) of a block copolymer rubber of butadiene and at least 20 percent of styrene is added to the blend and is dispersed as small discrete particles to improve impact strength. In another variation, a rubber-modified copolymer of vinyl chloride and 3–5 percent of propylene is used.

In another example, an intimate mixture is made of the following three components (with percentages based on weight of the composition): (1) about 45 percent of a rubber-modified vinyl chloride resin with a heat distortion temperature of about 66° C., and containing about 6 percent of an ethylenepropylene-diene rubber; (2) about 25 percent of an ABS resin containing about 50 percent of a butadiene-based rubber, and having a styrene:acrylonitrile ratio of about 75:25; and (3) 30 percent of an 82:18 copolymer of styrene and maleic anhydride. The heat distortion temperature will be about 90° C. or slightly higher, significantly higher than will be obtained in a two-component blend containing the same proportions of the rubber-modified vinyl chloride resin and the ABS resin. The impact strength of the three-component blend will also be significantly higher than will be obtained in a similar blend except that an unmodified vinyl chloride resin is used. In order to obtain a somewhat higher heat distortion temperature, up to 50 percent of the styrene in the ABS resin may be replaced by alpha-methylstyrene.

What is claimed is:

1. A polyblend composition comprising:
   (a) 80–20 percent by weight of a rubber-modified vinyl chloride resin, containing 0–20 percent, based on total monomers, of a copolymerizable, ethylenically unsaturated comonomer, selected from the group consisting of ethylene, propylene, an alpha-olefin containing 4–8 carbon atoms, vinyl acetate, vinylidene chloride, alkyl acrylate, acrylic acid, methacrylic acid, and methyl methacrylate, said resin prepared by polymerization of vinyl chloride monomer and the comonomer, in the presence of 2–20 percent, based on the weight of the resin, of a rubber to form a discretely dispersed graft copolymer, and wherein a major amount of the polymerized vinyl chloride homopolymer or copolymer present in said resin is ungrafted to the rubber; and (b) 20–80 percent by weight of a polymer consisting essentially of a vinyl aromatic monomer and an unsaturated dicarboxylic acid anhydride monomer in weight ratios of 95:5 to 70:30, and 0–25 percent, based on total monomers, of a copolymerizable, ethylenically unsaturated termonomer, selected from the group consisting of methyl methacrylate, acrylonitrile, and methacrylonitrile.

2. The polyblend composition of claim 1 wherein there is added up to 15 percent by weight, based on the weight of the polyblend, a block copolymer selected from the group consisting of an ungrafted block copolymer rubber containing 20–50 percent by weight of a vinyl aromatic monomer and 80–50 percent by weight of 1,3-butadiene, and hydrogenated such block copolymers, in the form of discretely dispersed particles.

3. The polyblend composition of claim 2 in which the vinyl aromatic monomer in the ungrafted block copolymer rubber is selected from the group consisting of styrene and p-methyl-styrene.

4. The polyblend composition of claim 1 wherein there is added up to 35 percent by weight, based on the weight of the polyblend, of a graft copolymer selected from the group consisting of (a) a copolymer of 30–80 percent by weight of methyl methacrylate and 70–20 percent by weight of a vinyl aromatic monomer, (b) a copolymer of 20–40 percent acrylonitrile and 80–60 percent by weight of a vinyl aromatic monomer, and (c) a copolymer of 20–40 percent methacrylonitrile and 80–60 percent by weight of a vinyl aromatic monomer; said copolymer being grafted onto 10–60 percent based on the weight of the graft copolymer, of a substrate rubber.

5. The polyblend composition of claim 4 wherein there is added up to 15 percent by weight, based on the weight of the polyblend, of an ungrafted block copolymer rubber containing 20–50 percent by weight of a vinyl aromatic monomer and 80–50 percent by weight of 1,3-butadiene, in the form of discretely dispersed particles.

6. The polyblend composition of claim 5 in which the vinyl aromatic monomer in the ungrafted block copolymer rubber is selected from the group consisting of styrene and p-methylstyrene.

7. The polyblend of claim 4 in which the substrate rubber is selected from the group consisting of polybutadiene and a block copolymer rubber containing 90–45 percent of butadiene and 10–55 percent by weight of a vinyl aromatic monomer selected from the group consisting of styrene and p-methylstyrene.

8. The polyblend composition of claim 1 wherein said rubber-modified vinyl chloride resin contains up to 10 percent by weight of a copolymerizable ethylenically unsaturated comonomer selected from the group consisting of vinyl acetate, ethylene and propylene.

9. The polyblend composition of claim 1 wherein the rubber used in the preparation of the rubber-modified vinyl chloride resin is selected from the 8 group consisting of a copolymer of ethylene and a copolymerizable comonomer selected from the group consisting of vinyl acetate, ethyl acrylate, methyl acrylate, propylene and butene-1; a terpolymer of ethylene, propylene and a diene monomer; chlorinated polyethylene; a butyl acrylate-based rubber; and a block copolymer of a vinyl aromatic monomer and butadiene.

10. The polyblend composition of claim 9 wherein said vinyl aromatic monomer, in said polymer, is selected from the group consisting of styrene and p-methylstyrene, and wherein said unsaturated dicarboxylic acid anhydride monomer is maleic anhydride.

11. The polyblend composition of claim 10 wherein said maleic anhydride is present in an amount of 10–25 percent by weight.

12. The polyblend of claim 11 wherein said polymer contains up to 25 percent by weight based on monomers of methyl methacrylate.

13. The polyblend composition according to claim 10 wherein said vinyl aromatic monomer, in said polymer, is selected from the group consisting of styrene and p-methylstyrene, and contains up to 20 percent by weight based on monomers of acrylonitrile.

14. The polyblend composition according to claim 4 in which the graft copolymer is a copolymer of 30–80 percent by weight of methyl methacrylate and 70–20 percent by weight of a vinyl aromatic monomer, selected from the group consisting of styrene and p-methylstyrene.

15. The polyblend composition according to claim 1 wherein said vinyl aromatic monomer, in said polymer, is selected from the group consisting of chlorostyrene, and a mixture of dichlorostyrene with styrene or p-methylstyrene, and wherein said unsaturated dicarboxylic acid anhydride is maleic anhydride.

16. The polyblend composition according to claim 4 wherein said graft copolymer contains an unsaturated nitrile selected from the group consisting of acrylonitrile and methacrylonitrile, and at least one vinyl aromatic monomer selected from the group consisting of styrene, p-methylstyrene, and alphamethylstyrene.

17. The polyblend composition according to claim 16 which contains 10–35 percent based on weight of the composition, of said graft copolymer, and the ratio of rubber-modified vinyl chloride resin to polymer is 67:33 to 40:60.

18. The polyblend composition according to claim 17 wherein said acrylonitrile in said polymer is present in an amount up to 20 percent; and said methyl methacrylate in said polymer, is present in an amount up to 25 percent.

19. The polyblend composition according to claim 17 wherein the rubber in said rubber-modified vinyl chloride resin is selected from the group consisting of a terpolymer of ethylene, propylene, and a diene termonomer; and a copolymer of ethylene and a comonomer selected from the group consisting of vinyl acetate, ethyl acrylate and methyl acrylate.

20. The polyblend composition of claim 14 wherein said polymer contains up to 25 percent by weight, based on monomers, of methyl methacrylate and 15–25 percent by weight of maleic anhydride, and the vinyl aromatic monomer in said polymer is selected from the group consisting of styrene and p-methylstyrene.

21. The polyblend composition according to claim 20 wherein the rubber used in the preparation of the rubbermodified vinyl chloride resin is selected from the group consisting of a copolymer of ethylene and an ethylenically unsaturated comonomer selected from the group consisting of methyl acrylate, ethyl acrylate, and vinyl acetate; and a terpolymer of ethylene, propylene, and a termonomer.

* * * * *